(12) United States Patent
Lee et al.

(10) Patent No.: US 6,914,147 B2
(45) Date of Patent: Jul. 5, 2005

(54) POLYALKYLENE OXIDE POROGENS HAVING HYPER-BRANCHES AND LOW DIELECTRIC-CONSTANT INSULATORS USING THEM

(75) Inventors: Changjin Lee, Daejeon (KR); Yongku Kang, Daejeon (KR); Jong Goo Kang, Choongjoo-shi (KR); Hee Jung Kim, Busan (KR); Moon Young Jin, Daejeon (KR); Sang Il Seok, Daejeon (KR); Kookheon Char, Seoul (KR); Sang-Hyun Chu, Seoul (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 10/118,094

(22) Filed: Apr. 9, 2002

(65) Prior Publication Data

US 2003/0078443 A1 Apr. 24, 2003

(30) Foreign Application Priority Data

Apr. 12, 2001 (KR) ........................................ 2001-19623

(51) Int. Cl.$^7$ .................................................. C07F 7/04
(52) U.S. Cl. ...................................... 556/460; 556/450
(58) Field of Search ................................. 556/460, 450, 556/400, 455, 458, 451

(56) References Cited

U.S. PATENT DOCUMENTS

| | | |
|---|---|---|
| 5,895,263 A | 4/1999 | Carter et al. |
| 6,143,643 A | 11/2000 | Carter et al. |
| 6,162,838 A | 12/2000 | Kohl |
| 6,472,334 B2 * | 10/2002 | Ikakura et al. ............... 438/778 |

OTHER PUBLICATIONS

CAL 123:9506 abs of Journal of Organometallic Chemistry by Crandall et al 489 (1–2) pp 5–13 1995.*

CA:82:4727 abs of Journal of South African Chem Inst. by Schep et al 27(2) pp56–62 1974.*

CA:84:74342 abs of Zhurnal Obshchei Khimii by Lebedev et al 45(12) pp 2645–9 1975.*

CA:133:336282 abs of JP 2000309753 Nov. 7, 2000.*

CA:108:75470 abs of Voprosy Khimii i Khimicheskoi Teknologii by Kuz'menko et al 81 pp 79–90 1986.*

CA:109:111013 abs of Macromolecules by Khan et al 21(9) pp 2684–9 1988.*

Cho et al.; "Low Dielectric–Constant Insulators for Electronics Applications"; Materials Chemistry and Physics, vol. 42, pp. 91–95, (1995).

Prakash et al.; "Silica Aerogel Films at Ambient Pressure"; Journal of Non–Crystalline Solids vol. 190, pp. 264–275, (1995).

Baney et al.; "Silsesquioxanes"; American Chemical Society, Chemical Reviews, vol. 95, No. 5, pp. 1409–1430, (1995).

* cited by examiner

*Primary Examiner*—Samuel Barts
(74) *Attorney, Agent, or Firm*—Finnegan, Henderson, Farabow, Garrett & Dunner, LLP

(57) ABSTRACT

The present invention relates to polyalkylene oxide porogens having hyper-branches and low dielectric-constant insulators using them. More particularly, the present invention relates to polyalkylene oxide porogens having hyper-branches expressed by the following formula (1), where the polyalkylene oxide porogen has a center molecular (D) having branches (W), and low dielectric-constant insulators having nanopores prepared by coating a mixture of the porogen and a high heat-resistant resin such as polysilsesquioxane and thermal treating the coated substrate at a temperature effective to degrade the porogen.

$$D\text{-}(Y\text{---}W)_l \qquad (1)$$

4 Claims, 2 Drawing Sheets

POLYALKYLENE OXIDE POROGENS HAVING HYPER-BRANCHES AND LOW DIELECTRIC-CONSTANT INSULATORS USING THEM

BACKGROUND OF THE INVENTION

FIELD OF THE INVENTION

The present invention relates to polyalkylene oxide porogens having hyper-branches and low dielectric-constant insulators using them. More particularly, the present invention relates to polyalkylene oxide porogens having hyper-branches expressed by the following formula (1), where the polyalkylene oxide porogen has a center molecular (D) having branches (W), and lowdielectric-constant insulators having nanopores prepared by coating a mixture of the porogen and a high heat-resistant resin such as polysilsesquioxane and thermal treating the coated substrate at a temperature effective to degrade the porogen, $$D\text{-(}Y\text{---}W)_l \quad (1)$$

wherein D is chosen from

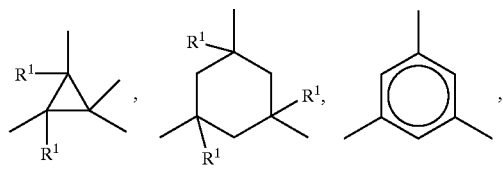

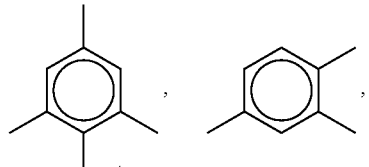

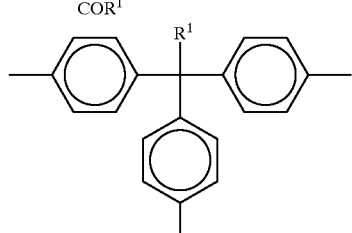

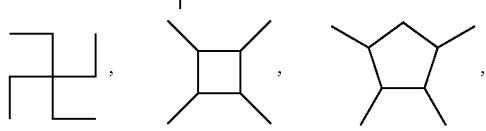

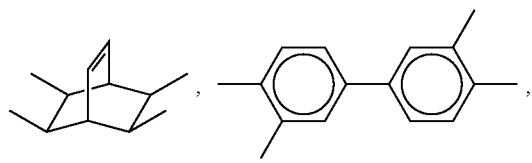

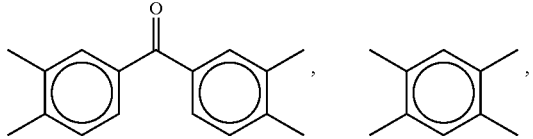

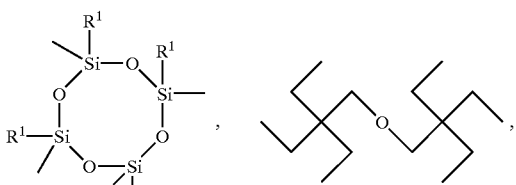

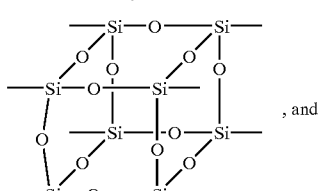

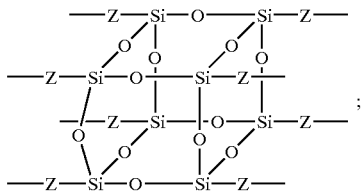

, and

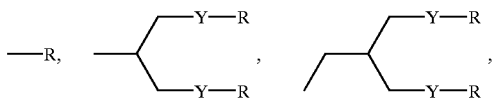

;

W is chosen from

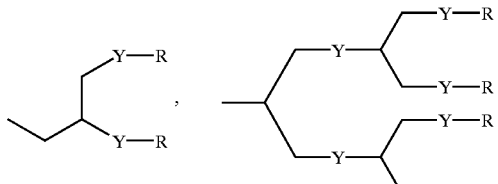

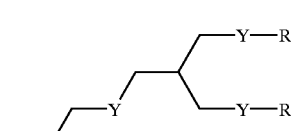

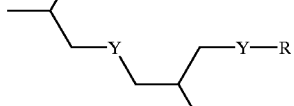

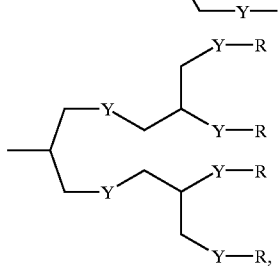

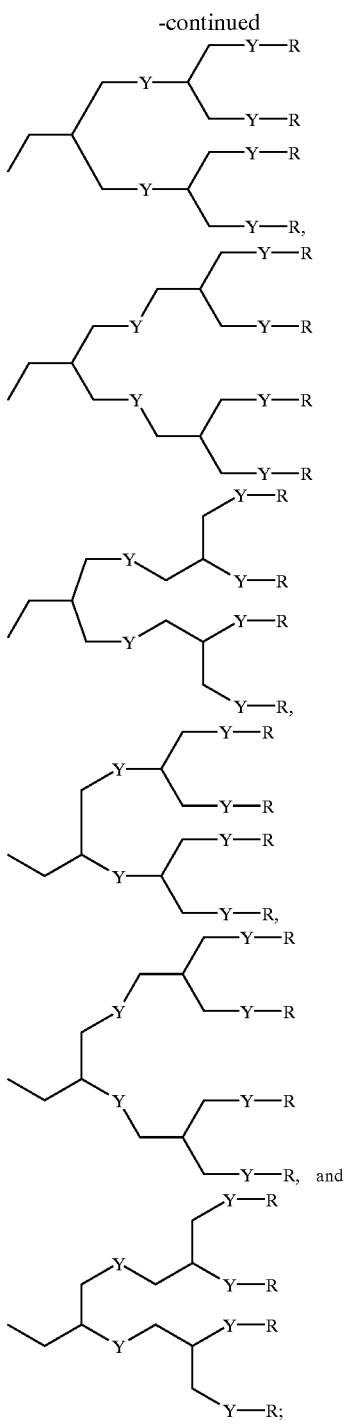

Y is a bridging group connecting between the center molecular and branches and chosen from

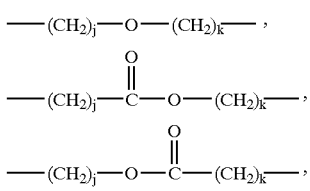

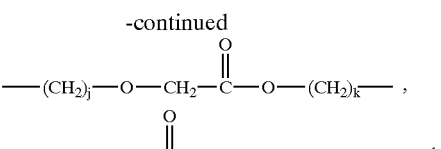

$$—(CH_2)_j—O—C(=O)—CH_2—O—(CH_2)_k—, \text{ and}$$

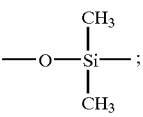

where each of j and k is independently an integer of 0 to 4; Z is

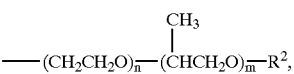

R is $$—(CH_2CH_2O)_n—(CHCH_2O)_m—R^2,$$
$$\text{with } CH_3 \text{ on the CH}$$

where each of n and m is independently an integer of 0 to 30;
$R^1$ is chosen from hydrogen, methyl, ethyl and phenyl;
$R^2$ is chosen from hydrogen, $C_1$–$C_5$ alkyl and benzyl; and
l is an integer of 3 to 8.

As semiconductor devices have become more highly integrated and to operation frequencies have also increased, the crosstalk noise and parasitic capacitance between the metal lines increases. Such increases in parasitic capacitance and noise can significantly delay the speed of semiconductor devices. The interconnect delay is proportional to resistance of the used metal lines and dielectric constant of the used intermetallic dielectric materials (RC delay). In order to overcome such signal delays, aluminum lines have been replaced to copper lines and it has been highly demanded to develop dielectric materials having lower dielectric constant than that (4.0) of silicon oxide prepared by chemical vapor deposition. There have been actively developed low dielectric-constant insulators such as organic materials for example, polyimides, polysilsequioxanes, parylene-F, or silk, and organic-inorganic hybrid materials. However, it was still unsatisfactory to achieve the desired dielectric insulator having a low dielectric constant of not higher than 2.5, preferably not higher than 2.0.

High porosity in the thin films has been applied to reduce the dielectric constant. For example, they have reported silica aerogel and xerogel films by a sol-gel method controlling the growth process at a low temperature, which had porosity in the range of 30 to 99%. Dielectric constants of the resulting silica aerogel and xerogels were not higher than 2.5 (S. S. Prakash et al., *J. Non-Cryst. Solid*, 190(1995) p.264 and C. C. Choi, et al., *Mat. Chem. Phys.*, 42(1995) p.91). However, these porous silica aerogel or xerogel films are not appropriate for chemical mechanical polishing due to poor mechanical strength and moisture absorption, which can cause reliability problems and increase dielectric constant due to open pores.

Methods for preparing porous insulators having closed pores by decomposing polysilsesquioxane/porous sacrificial material at an elevated temperature are proposed to overcome the above deficiencies. That means that porous insulator may be obtained by mixing polysilsesquioxane and sacrificial material, coating a mixture on the substrate to produce thin film, and heating the obtained thin film at a temperature sufficient to cause decomposition of the sacrificial material. The sacrificial material used to form porosity is generally called as porogen. It has been reported that norbornene-type polymer (U.S. Pat. No. 6,162,838) and linear polymers such as polycaprolactone and polyacrylate (U.S. Pat. No. 6,143,643) are used as porogen. Use of hyper branched polyester as porogen is also disclosed to produce fine porosity in U.S. Pat. No. 5,895,263.

However, since these polymers used as porogen have poor compatibility with polysilsesquioxane, thus inappropriate to produce uniformity pores having a diameter of lower than 0.1 μm, it is still required to improve such problems.

SUMMARY OF THE INVENTION

Accordingly, an object of the present invention is to provide a polyalkylene oxide porogen having hyper-branches to have excellent compatibility with various matrix compounds by controlling a polarity of terminal group and form closed nanopores by decomposition or vaporization at 200 to 450° C.

Another object of the present invention is to provide a low dielectric-constant insulator having the nanopores by mixing the polyalkylene oxide porogen having hyper-branches and a high heat-resistant resin such as polysilsesquioxane in an appropriate ratio, coating the mixture onto the substrate in a certain thickness, forming a polymeric thin film, and heating at a temperature to thermally decompose the porogen.

DETAILED DESCRIPTION OF THE INVENTION

Figure 1:
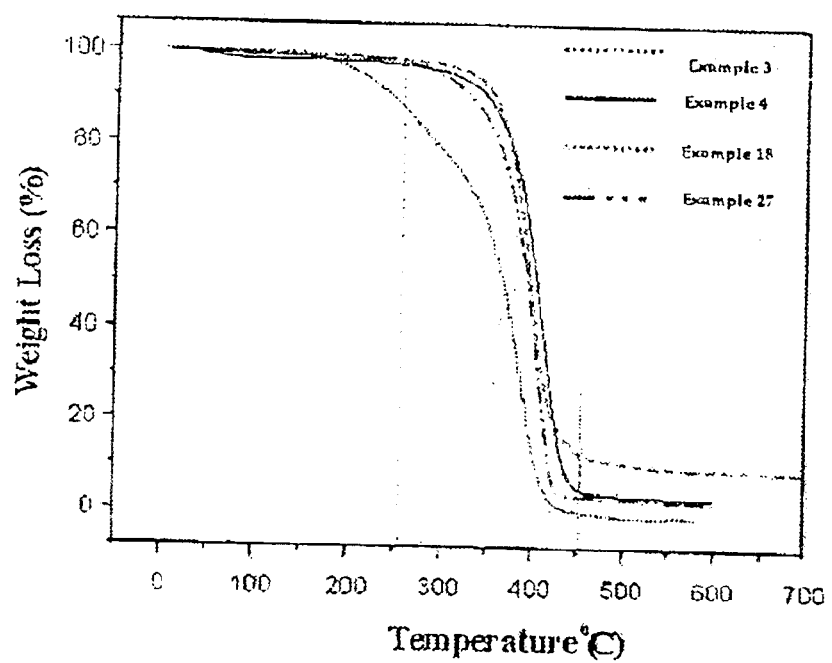
FIG. 1 represents a thermogravimetric analysis result of polyalkylene oxide porogen having hyper-branches of the present invention.

The present invention is described in more detain as set forth hereunder. The present invention provides a polyalkylene oxide porogen having hyper-branches expressed by the following formula (1), where the porogen has a center molecular (D) having hyper-branches (W), $$D(Y-W)_l \quad (1)$$

wherein D is chosen from

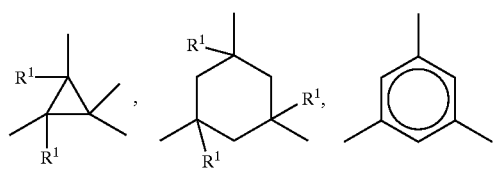

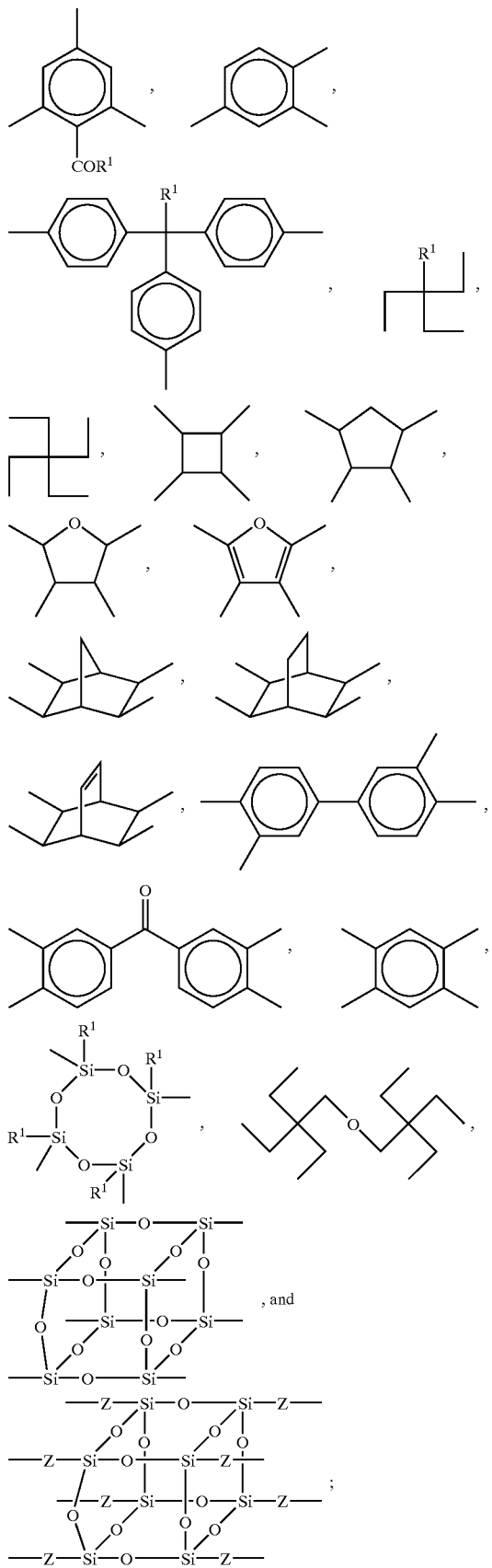

W is chosen from

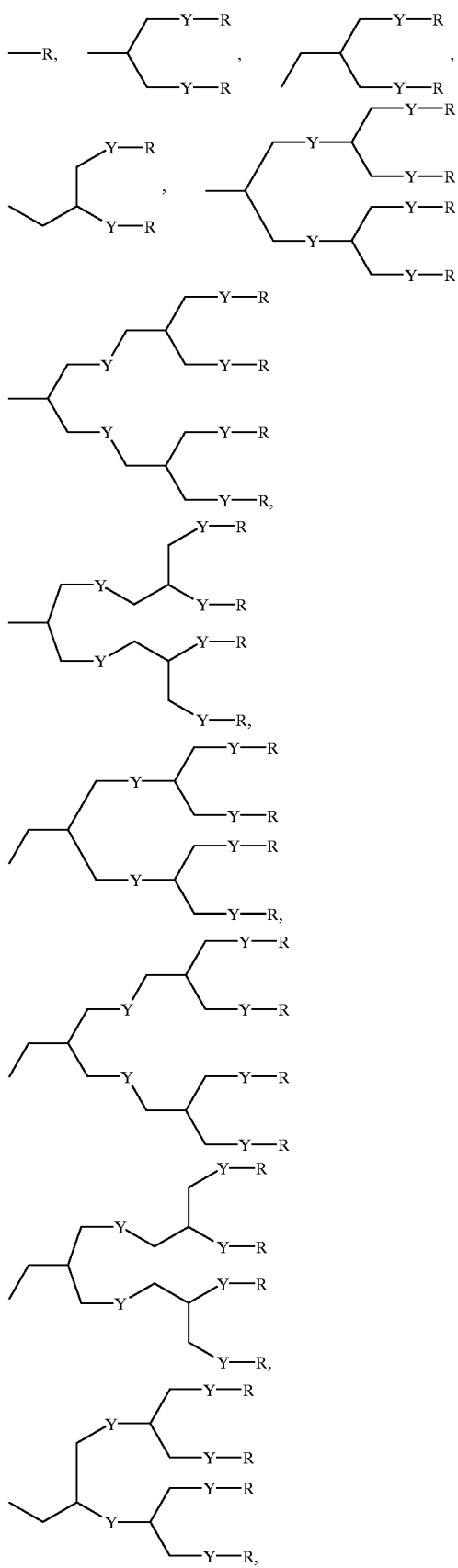

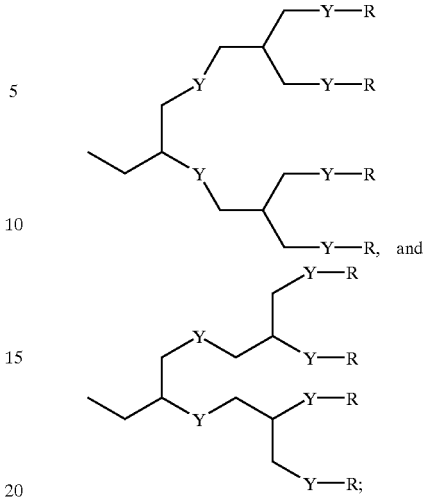

Y is a bridging group connecting between the center molecular and branches and chosen from

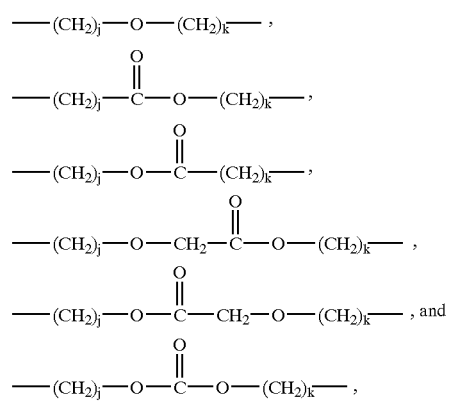

where each of n and k is independently an integer of 0 to 4;

Z is

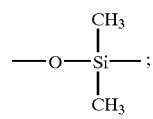

R is

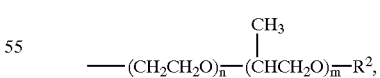

where each of n and m is independently an integer of 0 to 30;

$R^1$ is chosen from hydrogen, methyl, ethyl and phenyl;
$R^2$ is chosen from hydrogen, $C_1$–$C_5$ alkyl and benzyl; and
l is an integer of 3 to 8.

The polyalkylene oxide porogen having hyper-branches according to the present invention may be prepared by combining a center molecular having various structure and branches to be bonded thereto as shown in below.

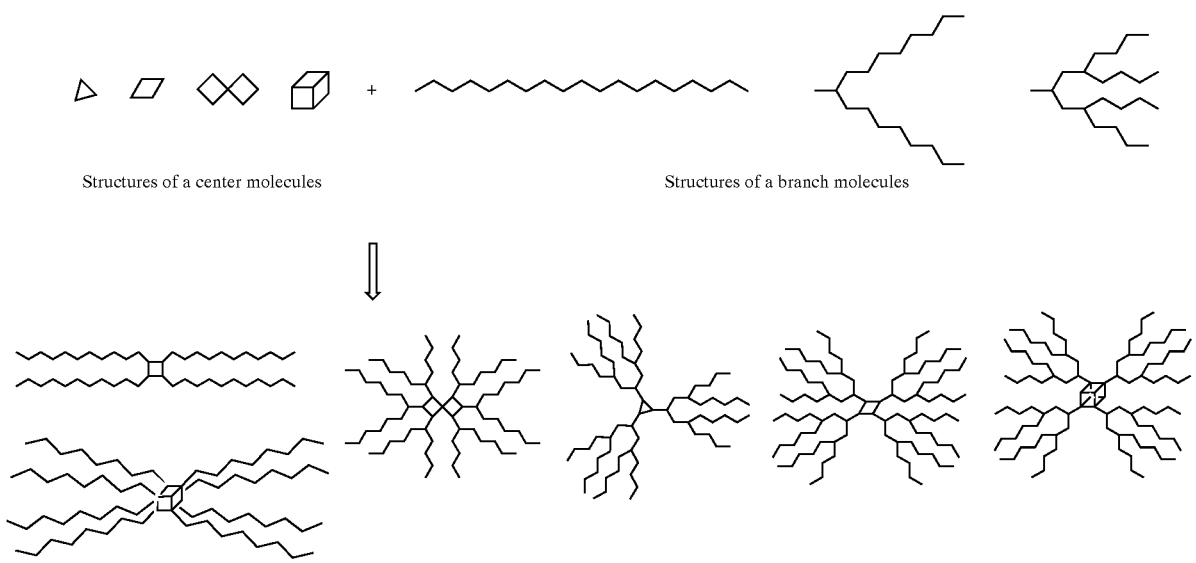

Examples of Porogen Having Hyper-branches

The center molecular (D) of the porogen in the present invention has 3, 4, 6, or 8 functional groups, capable of bonding easily to branches (W). The branches (W) of the porogen in the present invention bonded to the center molecular are one-arm, two-arms or four-arms polyalkylethers. Particularly, the center molecular, branches and the bridging group of porogen in the present invention are easily prepared from compounds, of which most are commercialized, via simple reactions, and polarity of the terminal group in the obtained polyalkylene oxide porogen can be easily controlled with hydrogen, alkyl or benzyl group depending on the polarity of matrix to be used.

The polyalkylene oxide porogen having hyper-branches of formula (1) may be prepared by the following known reaction: (i) hydrosilylation in Scheme 1; (ii) esterification in Scheme 2; or (iii) carbonation in Scheme 3, Scheme 1

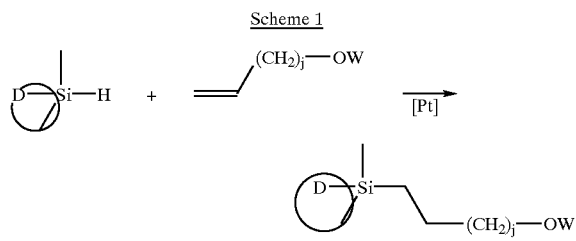

Scheme 2

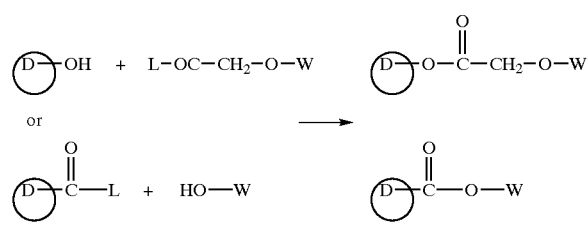

Scheme 3

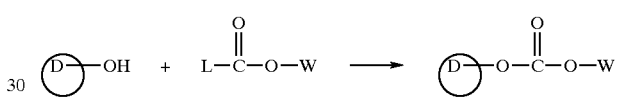

wherein D is a center molecular; W is branch molecular; j is an integer of 0 to 4;

L is Cl, OH, or

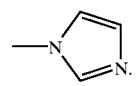

When a platinum catalyst bonded to polymer or silica is used in hydrosilylation of Scheme 1, it may minimize a platinum content contained in the corresponding product. When the esterification of Scheme 2 or carbonation of Scheme 3 avoids use of a chloride-containing catalyst or compound, it may minimize a chloride ion content contained in the corresponding final product. As shown in Schemes 1, 2 and 3, the porogen having hyper-branches of formula (1) may be prepared by connecting the center molecular having 3, 4, 6, or 8 functional groups with the branch molecular having one-arm, two-arms and four-arms structure.

Further, it is facile to control a polarity of the terminal group of porogen because a benzyl group substituted at the terminal portion ($R^2$) of porogen may be easily converted to a corresponding hydroxyl group through hydrogenolysis or photolysis as shown in Scheme 4; or a tert-butoxy group may be also converted to a hydroxyl group in the presence of acid catalyst as shown in Scheme 5.

Scheme 4

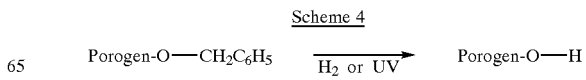

Scheme 5

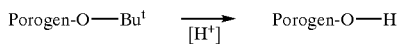

A compound having 2-arms is prepared by reacting porogen with methallyl dichloride, followed by hydroboration in a high yield as shown in Scheme 6. Another compound having 2-arms is also prepared by neucleophilic substitution as shown in Scheme 7, Scheme 6

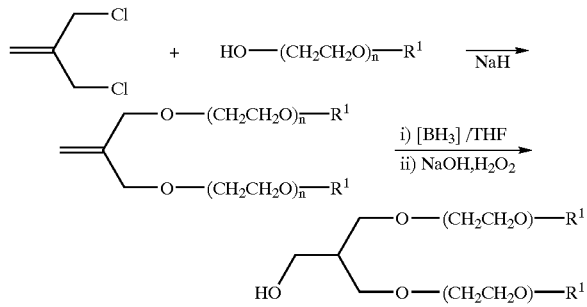

Scheme 7

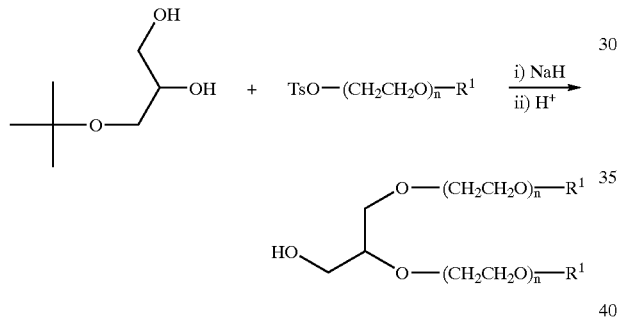

wherein $R^1$ is hydrogen, methyl, ethyl, or phenyl.

The compounds having 2-arms prepared in Schemes 6 and 7 are reacted repeatedly as in Scheme 6 or 7 to obtain the corresponding compounds having 4-arms, further 8-arms.

The hydroxyl group of porogen prepared in Scheme 6 or 7 may be further converted to carboxylic acid group by reacting as shown in Scheme 8, Scheme 8

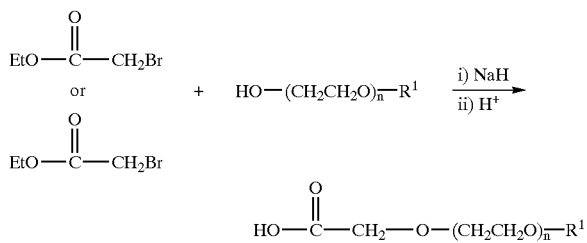

wherein $R^1$ is hydrogen, methyl, ethyl, or phenyl.

A porogen having a double bond in a branch molecular to be used for hydrosilylation is prepared by reacting allyl bromide with alcohol in the presence of a base catalyst as shown in Scheme 9 in a high yield. The intermediate olefin produced in Scheme 6 may be also used directly to produce a porogen having a double bond in a branch molecular.

Scheme 9

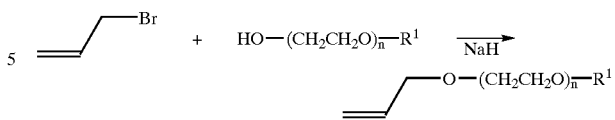

wherein $R^1$ is hydrogen, methyl, ethyl, or phenyl.

Polyalkylene oxide porogen having hyper-branches may be also prepared by reacting alcohol and silane in the presence of a catalyst as shown in Scheme 10, where the catalyst used is an organic metal catalyst containing tungsten, rhodium, platinum, tin or zinc.

Scheme 10

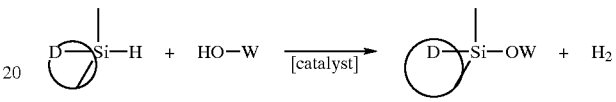

wherein D is a center molecular and W is a branch molecular.

The manufacturing method described in Scheme 10 provides advantageously polyalkylene oxide porogens having hyper-branches using polyalkylene oxide porogen having one-arm, two-arms and 4-arms.

Another method for substituting the terminal group of polyalkylene oxide porogens having hyper-branches is performed by a ring-opening polymerization of an alcohol with ethylene oxide, propylene oxide or its mixture mixed in an appropriate ratio in the presence of a base catalyst as shown in Scheme 11, Scheme 11

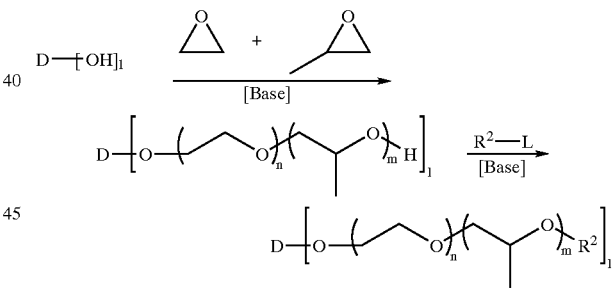

wherein D is a center molecular; L is chosen from Cl, Br, I and TsO; $R^2$ is chosen from hydrogen, $C_1$–$C_5$ alkyl and benzyl; each of n and m is an integer of 0 to 30; and l is an integer of 3 to 8.

The present invention further provides low dielectric constant insulators using the polyalkylene oxide porogen of formula (1), which is prepared by the following process described hereunder.

5 Weight % to 25 weight % of a high heat resistant resin, based to the organic solvent, is dissolved in an organic solvent. And then the polyalkylene oxide porogen of formula (1) is dissolved in the mixture in a desired content. The resin to be used in the present invention is preferably silane-based polymer, more preferably polysilsesquioxanes. The polysilsesquioxane is an organic silica polymer represented by $RSiO_{1.5}$, where R is hydrogen, methyl or phenyl and also its copolymer may be also used. The polysilsesquioxane may be prepared by known method (*Chem. Rev.*, vol. 95 p.1409, 1995) or purchased (e.g., Techniglass GR650, GR950). The organic solvent to be used in the present invention has excellent solubility toward a high heat resistant resin and porogen as well as being suitable for coating process. Examples of the organic solvent include cyclohexanone, methylisobutyl ketone, γ-butyrolactone, propylene glycol methyl ether acetate, N-methylpyrrolidinone, toluene, and xylene.

A mixture of the heat-resistant resin and porogen is coated on the substrate by any art-known methods, including spin-coating and bar-coating, and curing the coated thin film at about 200° C., which was reached with a certain rate, for an appropriate period. Then, a temperature is raised to decompose the porogen with a certain rate and maintained at that temperature for a time to produce the desired nanoporous films. The temperature where the porogen decomposes is in the range of 200 to 450° C., the rate applied is in the range of 2 to 20° C./min and the temperature is maintained for 10 minutes to 2 hours. The pore size produced is not larger than 0.05 μm and the porosity of the polysilsesquioxane thin film may be controlled with an amount of porogen used.

The following examples are intended to further illustrate the present invention without limiting its scope.

GENERAL EXAMPLE 1

Preparation of Porogen Via Hydrosilyation

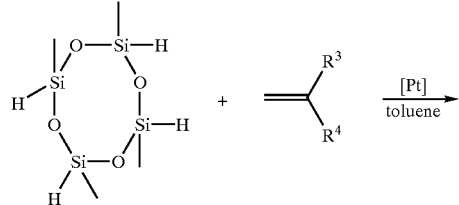

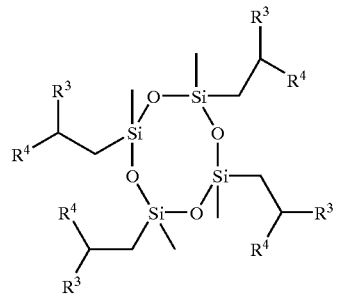

A three-necked flask of 100 mL was heated to remove moisture therein and $N_2$ gas was passed through the flask. 2,4,6,8-Tetramethylcyclotetrasiloxane (0.9 g, 3.7 mmol) and olefin (15 mmol) were dissolved in 15 mL of toluene in the dried flask. Platinum(0)-1,3-divinyl-1,1,3,3-tetramethyl disiloxane complex/xylene(3 mg) as a platinum catalyst was added to a reaction mixture at room temperature. When exothermic reaction was over, the reaction mixture was heated to 100° C. and reacted for 10 hours. Activated carbon(2 g) was added, stirred for 1 hour and filtered out the platinum catalyst and active carbon. The filtrate was evaporated to produce clear oil. The crude oil was purified by column chromatography on silica gel to produce the desired product which was dried at 80° C. for 24 hours and kept under $N_2$.

EXAMPLES 1–10

Various porogens were prepared by the same procedure as in General Example 1, except using olefins listed in Table 1. Each yield and elemental analysis is listed in Table 1.

TABLE 1

| Item | $R^3$, $R^4$ (olefin structure) | Porogen Yield | Elemental Analysis |
|---|---|---|---|
| Example 1 | $R^3$ = —$CH_2$—$(OCH_2CH_2)_3$—OMe<br>$R^4$ = H | 75% | Calculated C, 50.11; H, 9.08<br>Found C, 49.97; H, 9.15 |
| Example 2 | $R^3$ = —$CH_2$—$(OCH_2CH_2)_5$—OMe<br>$R^4$ = H | 78% | Calculated C, 50.84; H, 9.10<br>Found C, 51.49; H, 9.15 |
| Example 3 | $R^3$ = —$CH_2$—$(OCH_2CH_2)_n$—OMe<br>$R^4$ = H  n = 7.2  Mn = 350 | 60% | Calculated C, 51.42; H, 9.19<br>Found C, 51.90; H, 9.15 |
| Example 4 | $R^3$ = —$CH_2$—$(OCH_2CH_2)_n$—OMe<br>$R^4$ = H  n = 16.3  Mn = 750 | 58% | Calculated C, 53.10; H, 9.68<br>Found C, 53.17; H, 9.15 |
| Example 5 | $R^3$, $R^4$ = —$CH_2$—$(OCH_2CH_2)_3$—OMe | 55% | Calculated C, 51.70; H, 9.31<br>Found C, 51.79; H, 9.15 |
| Example 6 | $R^3$, $R^4$ = —$CH_2$—$(OCH_2CH_2)_n$—OMe<br>n = 7.2  Mn = 350 | 52% | Calculated C, 53.10; H, 9.42<br>Found: C, 53.03; H, 9.15 |
| Example 7 | $R^3$, $R^4$ = —$CH_2$O—[branched with two —$(OCH_2CH_2)_n$—OMe]<br>n = 7.2  Mn = 350 | 60% | Calculated C, 54.02; H, 9.41<br>Found: C, 53.78; H, 9.15 |
| Example 8 | $R^3$ = —$CH_2$O—[branched with two —$(OCH_2CH_2)_n$—OMe]<br>$R^4$ = H  n = 7.2  Mn = 350 | 50% | Calculated C, 53.05; H, 9.35<br>Found: C, 53.11; H, 9.15 |

TABLE 1-continued

| | Porogen | | |
|---|---|---|---|
| Item | ![R3/R4 alkene structure] | Yield | Elemental Analysis |
| Example 9 | $R^3, R^4 =$ —CH$_2$OCH$_2$— with branches (OCH$_2$CH$_2$)$_3$—OMe and (OCH$_2$CH$_2$)$_3$—OMe | 48% | Calculated C, 53.11; H, 9.28<br>Found: C, 53.16; H, 9.15 |
| Example 10 | $R^3, R^4 =$ —CH$_2$O— with branches —O—CH—(CH$_2$O—CH$_2$C$_6$H$_5$)$_2$ and —O—CH—(CH$_2$O—CH$_2$C$_6$H$_5$)$_2$ | 50% | Calculated C, 72.14; H, 7.33<br>Found C, 72.23; H, 7.37 |

EXAMPLES 11–24

Various porogens in Tables 2 and 3 were prepared by the same procedure as in General Example 1, except using hydridosidsesquioxane or octakis(dimethylsilyloxy) silsesquioxane having 8 functional groups to perform hydrosilylation with olefin. The structure of obtained porogens is as follow:

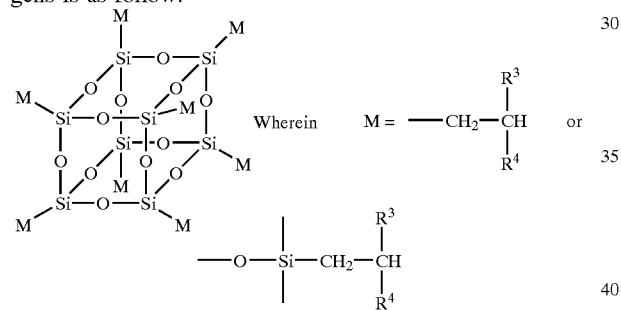

Wherein $$M = -CH_2-\underset{R^4}{\overset{R^3}{\underset{|}{\overset{|}{C}}H}} \quad \text{or}$$

$$-O-Si-CH_2-\underset{R^4}{\overset{R^3}{\underset{|}{\overset{|}{C}}H}}$$

TABLE 2

| | Porogen | | |
|---|---|---|---|
| Item | $M = -CH_2-\underset{R^4}{\overset{R^3}{\underset{|}{\overset{|}{C}}H}}$ | Yield | Elemental Analysis |
| Example 11 | $R^3 =$ —CH$_2$—(OCH$_2$CH$_2$)$_5$—OM<br>$R^4 =$ H | 75% | Calculated: C, 48.11; H, 8.60<br>Found: C, 48.67; H, 8.46 |
| Example 12 | $R^3 =$ —CH$_2$—(OCH$_2$CH$_2$)$_n$—OM<br>$R^4 =$ H n = 7.2 Mn = 350 | 78% | Calculated C, 49.11; H, 8.60<br>Found: C, 49.86; H; 8.60 |
| Example 13 | $R^3 =$ —CH$_2$—(OCH$_2$CH$_2$)$_n$—OM<br>$R^4 =$ H n = 16.3 Mn = 750 | 60% | Calculated C, 52.11; H, 8.75<br>Found: C, 52.09; H; 8.86 |
| Example 14 | $R^3, R^4 =$ —CH$_2$—(OCH$_2$CH$_2$)$_3$—OM | 58% | Calculated C, 49.25; H, 8.70<br>Found: C, 49.86; H, 8.60 |
| Example 15 | $R^3 =$ —CH$_2$OCH$_2$— with branches (OCH$_2$CH$_2$)$_3$—OMe and (OCH$_2$CH$_2$)$_3$—OM<br>$R^4 =$ H | 55% | Calculated: C, 50.11; H, 8.71<br>Found: C, 50.29; N, 8.65 |

TABLE 3

| Item | $M = -O-Si-CH_2-CH(R^3)(R^4)$ (Porogen) | Yield | Elemental Analysis |
|---|---|---|---|
| Ex. 16 | $R^3 = -CH_2-(OCH_2CH_2)_5-OM$<br>$R^4 = H$ | 75% | Calculated C, 45.30; H, 8.53<br>Found: C, 45.80; H, 8.41 |
| Ex. 17 | $R^3 = -CH_2-(OCH_2CH_2)_n-OM$<br>$R^4 = H$  n = 7.2  Mn = 350 | 78% | Calculated: C, 47.11; H, 8.60<br>Found: C, 47.31; H, 8.54 |
| Ex. 18 | $R^3 = -CH_2-(OCH_2CH_2)_n-OM$<br>$R^4 = H$  n = 16.3  Mn = 750 | 60% | Calculated: C, 50.27 H, 8.98<br>Found: C, 50.48; H, 8.81 |
| Ex. 19 | $R^3, R^4 = -CH_2-(OCH_2CH_2)_3-OM$ | 58% | Calculated: C, 50.27; H, 8.98<br>Found: C, 47.31; H, 8.54 |
| Ex 20 | $R^3 = -CH_2OCH_2-C(\,(OCH_2CH_2)_3-OMe\,)(\,(OCH_2CH_2)_3-OM\,)$<br>$R^4 = H$ | 55% | Calculated: C, 48.60; H, 8.93<br>Found: C, 48.82; H, 8.73 |
| Ex. 21 | $R^3, R^4 = -CH_2-(OCH_2CH_2)_n-OM$<br>n = 7.2  Mn = 350 | 52% | Calculated: C, 50.27; H, 8.98<br>Found: C, 50.20; H, 9.10 |
| Ex. 22 | $R^3, R^4 = -CH_2O-C(\,(OCH_2CH_2)_3-OM\,)(\,(OCH_2CH_2)_3-OMe\,)$ | 47% | Calculated: C, 50.27; H, 8.98<br>Found: C, 50.15; H, 9.06 |
| Ex. 23 | $R^3 = -CH_2O-C(\,(OCH_2CH_2)_n-OMe\,)(\,(OCH_2CH_2)_n-OMe\,)$<br>$R^4 = H$  n = 7.2  Mn = 350 | 60% | Calculated: C, 50.30; H, 8.87<br>Found: C, 50.48; H, 8.81 |
| Ex. 24 | $R^3, R^4 = -CH_2OCH_2-C(\,(OCH_2CH_2)_3-OMe\,)(\,(OCH_2CH_2)_3-OMe\,)$ | 50% | Calculated: C, 50.61; H, 8.90<br>Found: C, 50.67; H, 8.82 |

GENERAL EXAMPLE 2

Preparation of Porogen Via Esterification

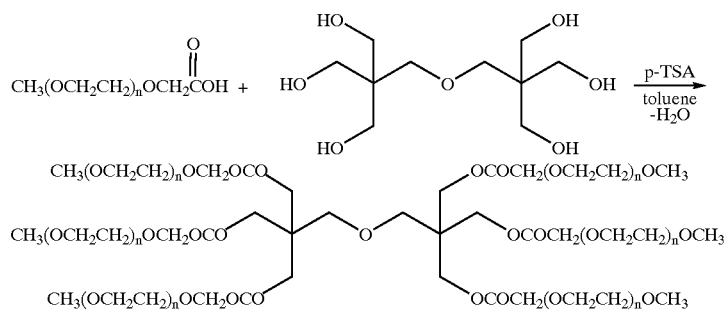

Dipentaerythritol(1.865 g, 7.337 mmol), methoxypolyethyleneoxy acetic acid(Mw=750, 23.35 g, 57.23 mmol), and p-toluenesulfonic acid(1 g) were added to 80 mL of toluene in 250 mL of a three-necked flask. The reaction mixture was heated to 120° C. and reacted for 24 hours, while removing water produced during the reaction using a dean-stark trap. The reaction mixture was extracted with methylene chloride and water. The organic layer was washed with saturated $NaHCO_3$, dried over anhydrous $NaSO_4$, and evaporated to dryness. The residue was purified by column chromatography on silica gel to produce the desired product, which was further dried at 80° C. for 24 hours and kept under $N_2$ (yield 95%).

$^1$H NMR($CDCl_3$) δ(ppm) 3.35(s, 18H), 3.5(m, 13.41H), 3.6–3.8(m, 150.39H), 4.3(s, 15.9H);

Elemental analysis: Found; C, 53.20; H, 8.97 (calculated: C, 53.23; H 8.73).

EXAMPLE 25–38

Porogens in Table 4 were prepared by the same esterification procedure as in General Example 2.

TABLE 4

| Item | Porogen | R⁵ | Yield | Elemental Analysis |
|---|---|---|---|---|
| Ex. 25 | R⁵O, OR⁵, ⁵O, OR⁵, R⁵O, OR⁵, OR⁵ (pentaerythritol ether structure) | —C(O)—CH₂O—(CH₂CH₂O)$_n$—OCH₃; n = 16.3, Mn = 750 | 95% | Calculated C, 53.29; H, 8.97 Found: C, 53.23; H, 8.73 |
| Ex. 26 | | —C(O)—CH₂O—(CH₂CH₂O)$_n$—OCH₃; n = 7.2, Mn = 350 | 75% | Calculated C, 51.89; H, 8.50 Found C, 52.04; H, 8.34 |
| Ex. 27 | | —C(O)—CH₂O—CH[(OCH₂CH₂)$_n$—OCH₃][(OCH₂CH₂)$_n$—OCH₃]; n = 7.2, Mn = 350 | 69% | Calculated C, 53.35; H, 8.99 Found: C, 53.75; H, 8.82 |
| Ex. 28 | | —C(O)—CH₂OCH₂—CH[(OCH₂CH₂)₃—OCH₃][(OCH₂CH₂)₃—OCH₃] | 71% | Calculated C, 53.10; H, 8.71 Found C, 53.17; H, 8.56 |
| Ex. 29 | H₃C-C(CH₂OR⁵)₃ | —C(O)—CH₂O—(CH₂CH₂O)₃—CH₃ | 81% | Calculated C, 53.30; H, 8.34 Found C, 52.45; H, 8.25 |
| Ex. 30 | | —C(O)—CH₂O—(CH₂CH₂O)$_n$—OCH₃; n = 7.2, Mn = 350 | 75% | Calculated C, 53.23; H, 8.70 Found C, 53.32; H, 8.63 |
| Ex. 31 | | —C(O)—CH₂O—(CH₂CH₂O)$_n$—OCH₃; n = 16.3, Mn = 750 | 76% | Calculated C, 53.85; H, 8.92 Found C, 53.91; H, 8.88 |
| Ex. 32 | | —C(O)—CH₂O—CH[(OCH₂CH₂)$_n$—OCH₃][(OCH₂CH₂)$_n$—OCH₃]; n = 7.2, Mn = 350 | 65% | Calculated C, 53.88; H, 8.90 Found C, 53.91; H, 8.88 |
| Ex. 33 | | —C(O)—CH₂OCH₂—CH[(OCH₂CH₂)₃—OCH₃][(OCH₂CH₂)₃—OCH₃] | 61% | Calculated C, 53.35; H, 8.80 Found C, 53.44; H, 8.68 |
| Ex. 34 | C(CH₂OR⁵)₄ | —C(O)—CH₂O—(CH₂CH₂O)₃—CH₃ | 72% | Calculated C, 50.11; H, 8.01 Found C, 50.82; H, 7.91 |

GENERAL EXAMPLE 3

Preparation of Porogen Via Esterification

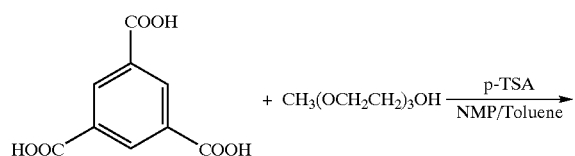

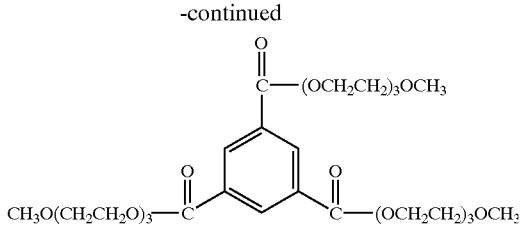

1,3,5-Benzenetricarboxylic acid(0.05 mol. 10.356 g), triethylene glycol methyl ether(0.18 mol. 29.56 g) and p-toluenesulfonic acid(0.1 g) were dissolved in 50 mL of NMP in 500 mL of a three-necked flask. The reaction mixture was stirred for 1 hour. Toluene (150 mL) was added to the reaction mixture which was further reacted at 120° C., while removing water produced during the reaction using a dean-stark trap. The reaction mixture was performed for 48 hours till the starting material, benzenetricarboxylic acid, was disappeared. The reaction mixture was evaporated to remove toluene and NMP under the reduced pressure. The residue was dissolved in methylene chloride and washed with water and aqueous $NaHCO_3$ solution twice. The organic layer was dried over anhydrous $MgSO_4$ and evaporated to dryness. The residue was purified by column chromatography on silica gel to obtain desired ester (yield 25%).

$^1$H NMR($CDCl_3$) δ(ppm) 3.36(s, 9H), 3.53(m, 6.07H), 3.68 (m, 18.2H), 3.87(m, 6.22H), 8.8(s, 2.73H);

Elemental analysis: Found C, 55.87%; H, 7.52% (Calculated: C, 55.55%; H, 7.46%)

EXAMPLES 39–48

Porogens in Table 5 were prepared by the same esterification procedure in General Example 3.

TABLE 5

| Item | Porogen | OR | Yield | Elemental Analysis |
|---|---|---|---|---|
| Ex. 39 | 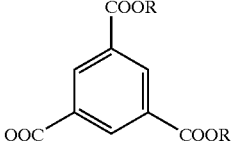 | —($OCH_2CH_2$)$_3$$OCH_3$ | 25% | Calculated C, 55.87; H, 7.52<br>Found C, 55.55; H, 7.46 |
| Ex. 40 | | —O—($CH_2CH_2O$)$_n$—$CH_3$<br>n = 16.3 Mn = 750 | 82% | Calculated C, 54.77; H, 8.80<br>Found C, 54.81; H, 8.69 |
| Ex. 41 | | 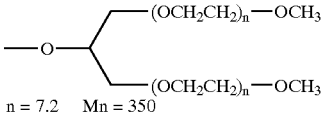<br>n = 7.2 Mn = 350 | 76% | Calculated C, 54.79; H, 8.75<br>Found C, 54.81; H, 8.69 |
| Ex. 42 | | 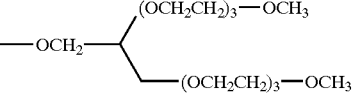 | 75% | Calculated C, 54.95; H, 8.35<br>Found C, 55.03; H, 8.31 |
| Ex. 43 | | 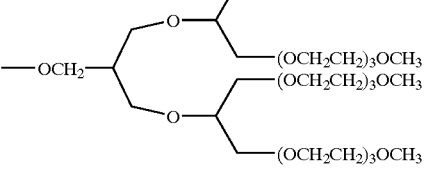 | 66% | Calculated C, 55.86; H, 8.95<br>Found C, 55.27; H, 8.82 |
| Ex. 44 | 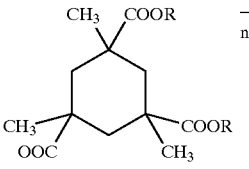 | —O—($CH_2CH_2O$)$_n$—$CH_3$<br>n = 7.2 Mn = 350 | 81% | Calculated C, 55.80; H, 8.93<br>Found C, 55.87; H, 8.88 |
| Ex. 45 | | —O—($CH_2CH_2O$)$_n$—$CH_3$<br>n = 16.3 Mn = 750 | 83% | Calculated C, 55.20; H, 8.98<br>Found C, 55.21; H, 9.02 |
| Ex. 46 | | 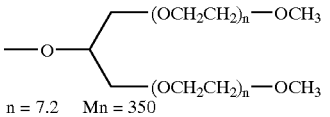<br>n = 7.2 Mn = 350 | 75% | Calculated C, 55.16; H, 9.10<br>Found C, 55.21; H, 9.02 |
| Ex. 47 | | 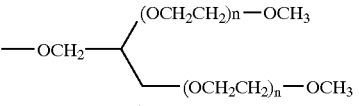<br>n = 7.2 Mn = 350 | 71% | Calculated C, 55.66; H, 8.97<br>Found C, 55.21; H, 9.02 |

TABLE 5-continued

| Item | Porogen | OR | Yield | Elemental Analysis |
|---|---|---|---|---|
| Ex. 48 | 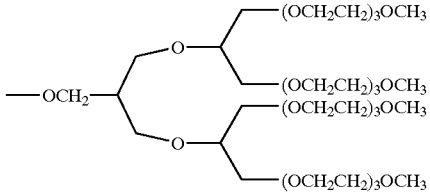 | | 66% | Calculated C, 55.43; H, 9.20<br>Found C, 55.61; H, 9.11 |

GENERAL EXAMPLE 4

Preparation of Porogen Via Esterification

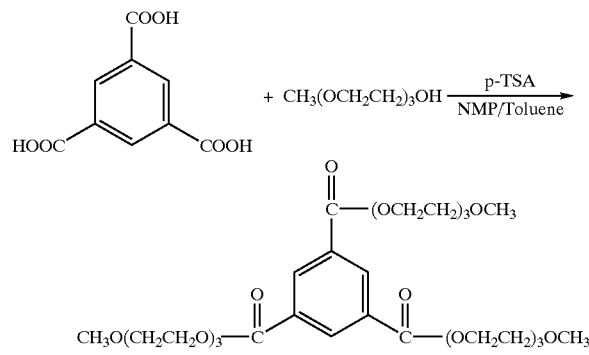

A tetracarboxy ester was prepared by reacting dianhydride and alcohol as shown in General Example 3. Especially, dianhydride is insoluble in nonpolar solvents such as toluene but soluble in polar solvents such as NMP. Thus, an esterification was performed by using of a mixture of toluene and NMP. Pyromellitic dianhydride (10 mmol), triethylene glycol methyl ether (42 mmol) and p-toluenesulfonic acid (0.1 g) were dissolved in 50 mL of NMP. The reaction mixture was stirred for 1 hour. Toluene (100 mL) was added the reaction mixture which was reacted at 120° C. till water was not produced during the reaction. The reaction mixture was evaporated to remove toluene and NMP solvent under the reduced pressure. The residue was dissolved in methylene chloride and washed with water and aqueous NaHCO$_3$ solution several times. The organic layer was dried over anhydrous MgSO$_4$ and evaporated to dryness. The residue was purified by column chromatography on silica gel to obtain desired ester (yield 73%).

Elemental analysis: Found C 54.60%; H 7.38% (Calculated C 54.41%; H 7.45%).

EXAMPLES 49–60

Porogens in Table 6 were prepared by the same esterification procedure in General Example 4.

TABLE 6

| Item | Porogen | OR | Yield | Elemental Analysis |
|---|---|---|---|---|
| Ex. 49 | 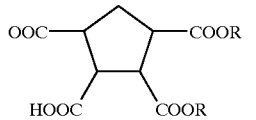 | —(OCH$_2$CH$_2$)$_3$OCH$_3$ | 73% | Calculated C, 54.60%; H, 7.38%<br>Found C, 54.41%; H, 7.45% |
| Ex. 50 | | —O—(CH$_2$CH$_2$O)$_n$—CH$_3$<br>n = 16.3  Mn = 750 | 70% | Calculated C, 53.35; H, 8.99<br>Found C, 54.25; H, 8.85 |
| Ex. 51 | | 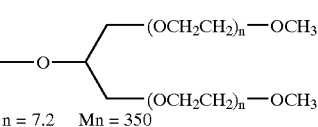<br>n = 7.2  Mn = 350 | 56% | Calculated C, 54.21; H, 8.93<br>Found C, 54.25; H, 8.85 |
| Ex. 52 | | 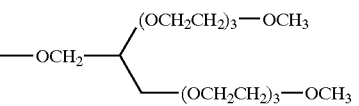 | 59% | Calculated C, 53.93; H, 8.68<br>Found C, 54.02; H, 8.60 |

TABLE 6-continued

| Item | Porogen | OR | Yield | Elemental Analysis |
|---|---|---|---|---|
| Ex. 53 | ROOC—[norbornane with 4 COOR groups]—COOR, OOC, COOR | —O—(CH$_2$CH$_2$O)$_n$—CH$_3$<br>n = 16.3  Mn = 750 | 65% | Calculated C, 54.68; H, 8.85<br>Found C, 54.74; H, 8.80 |
| Ex. 54 | | —O—CH(CH$_2$(OCH$_2$CH$_2$)$_n$—OCH$_3$)(CH$_2$(OCH$_2$CH$_2$)$_n$—OCH$_3$)<br>n = 7.2  Mn = 350 | 56% | Calculated C, 54.63; H, 8.83<br>Found C, 54.74; H, 8.80 |
| Ex. 55 | | —OCH$_2$—CH((OCH$_2$CH$_2$)n—OCH$_3$)((OCH$_2$CH$_2$)$_n$—OCH$_3$)<br>n = 7.2  Mn = 350 | 60% | Calculated C, 54.66; H, 8.90<br>Found C, 54.74; H, 8.80 |
| Ex. 56 | | —OCH$_2$—CH(—O—CH(CH$_2$(OCH$_2$CH$_2$)$_3$OCH$_3$)(CH$_2$(OCH$_2$CH$_2$)$_3$OCH$_3$))(—O—CH(CH$_2$(OCH$_2$CH$_2$)$_3$OCH$_3$)(CH$_2$(OCH$_2$CH$_2$)$_3$OCH$_3$)) | 44% | Calculated C, 55.15; H, 8.87<br>Found C, 55.20; H, 8.93 |
| Ex. 57 | OOC—[benzene with 4 COOR groups]—COOR, OOC, COOR | —O—(CH$_2$CH$_2$O)$_n$—CH$_3$<br>n = 16.3  Mn = 750 | 75% | Calculated C, 54.45; H, 8.83<br>Found C, 54.50; H, 8.70 |
| Ex. 58 | | —OCH$_2$—CH((OCH$_2$CH$_2$)n—OCH$_3$)((OCH$_2$CH$_2$)$_n$—OCH$_3$)<br>n = 7.2  Mn = 350 | 62% | Calculated C, 54.42; H, 8.76<br>Found C, 54.50; H, 8.70 |
| Ex. 59 | | —O—CH(CH$_2$(OCH$_2$CH$_2$)$_n$—OCH$_3$)(CH$_2$(OCH$_2$CH$_2$)$_n$—OCH$_3$)<br>n = 7.2  Mn = 350 | 67% | Calculated C, 54.46; H, 8.81<br>Found C, 54.50; H, 8.70 |
| Ex. 60 | | —OCH$_2$—CH(—O—CH(CH$_2$(OCH$_2$CH$_2$)$_3$OCH$_3$)(CH$_2$(OCH$_2$CH$_2$)$_3$OCH$_3$))(—O—CH(CH$_2$(OCH$_2$CH$_2$)$_3$OCH$_3$)(CH$_2$(OCH$_2$CH$_2$)$_3$OCH$_3$)) | 52% | Calculated C, 54.93; H, .87<br>Found C, 54.99; H, 8.83 |

GENERAL EXAMPLE 5

Preparation of Porogen Via Carbonation

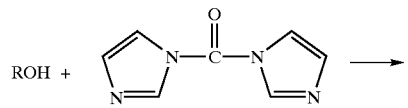

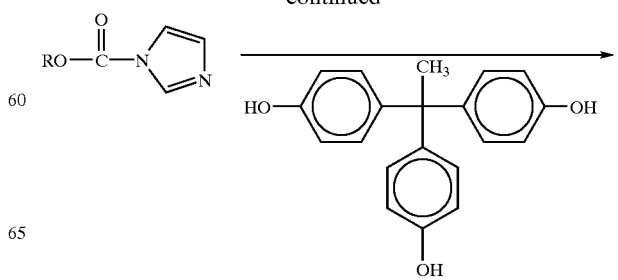

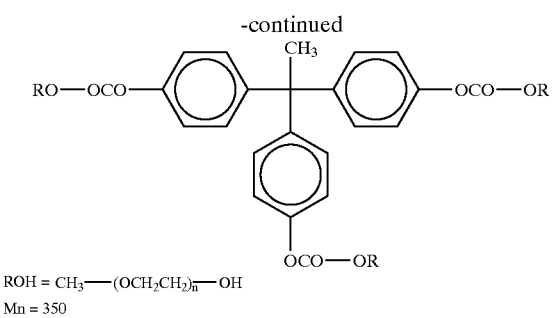

ROH = CH₃—(OCH₂CH₂)ₙ—OH
Mn = 350

Preparation of Poly(ethylene glycol)methyl Ether Carbonylimidazole (PEGMCI)

Polyethylene glycol methyl ether($M_w$=350, 35 g) and 1,1-carbonyl diimidazole(19.45 g) were added to 200 mL of dry tetrahydrofuran in 1000 mL three-necked flask equipped with thermometer, dropping funnel and stirring hot plate. The reaction mixture was stirred at 40–50° C. for 5–6 hours under $N_2$. Unreacted carbonyl diimidazole was filtered out and the filtrate was extracted with methylene chloride and 5% of an aqueous NaOH solution three times. The combined methylene chloride layer was dried over anhydrous $MgSO_4$ and evaporated to obtain the desired PEGMCI which was further dried under vacuum to produce 35.0 g of PEGMCI (yield 79%).

¹H-NMR(300 MHz, CDCl₃) δ(ppm) 8.14(s, NCHNCO, 1H), 7.44(s, NCHCHNCO, 1H), 7.07(s, NCHCHNCO, 1H), 3.66–3.86(m, OCH₂CH₂O, 28.8H), 3.52(S, OCH₃, 3H)

Preparation of Porogen from PEGMCI

PEGMCI(13.4 g) and 1,1,1-trishydroxyphenylethane (3.06 g) were added into 150 mL of dry THF in 1000 mL of a three-necked flask equipped with thermometer, dropping funnel and stirring plate. The reaction mixture was stirred at 80° C. for 24 hours under $N_2$. The reaction mixture was evaporated to remove THF and the residue was extracted with methylene chloride and 5% NaOH aqueous solution three times. The combined methylene chloride layer was dried over anhydrous $MgSO_4$ and evaporated to obtain the desired porogen having carbonate group (yield 85% after dried under vacuum).

EXAMPLES 61–73

Preparation of Porogens Via Carbonation

Porogens in Table 7 were prepared by the same carbonation procedure in General Example 5.

TABLE 7

| Item | Porogen | OR | Yield | Elemental Analysis |
|---|---|---|---|---|
| Ex. 61 | (triphenyl OCO-R structure) | —O—(CH₂CH₂O)ₙ—CH₃<br>n = 7.2 Mn = 350 | 85% | Calculated C, 53.02; H, 7.86<br>Found C, 53.07; H, 7.79 |
| Ex. 62 | | —O—(CH₂CH₂O)ₙ—CH₃<br>n = 16.3 Mn = 750 | 68% | Calculated C, 56.40; H, 8.42<br>Found C, 56.47; H, 8.39 |
| Ex. 63 | —O—CH(—(OCH₂CH₂)ₙ—OCH₃)₂<br>n = 7.2 Mn = 350 | | 62% | Calculated C, 56.39; H, 8.44<br>Found C, 56.47; H, 8.39 |
| Ex. 64 | —OCH₂—C(—(OCH₂CH₂)ₙ—OCH₃)₂<br>n = 7.2 Mn = 350 | | 65% | Calculated C, 56,40; H, 8.42<br>Found C, 56.47; H, 8.39 |
| Ex. 65 | —OCH₂—C(—O—CH(—(OCH₂CH₂)₃OCH₃)₂)₂ | | 53% | Calculated C, 56.60; H, 8.58<br>Found C, 56.71; H, 8.55 |
| Ex. 66 | (pentaerythritol-based tetra-ester structure) | —O—(CH₂CH₂O)ₙ—CH₃<br>n = 16.3 Mn = 750 | 77% | Calculated C, 53.16; H, 8.77<br>Found C, 53.20; H, 8.72 |

TABLE 7-continued

| Item | Porogen | OR | Yield | Elemental Analysis |
|---|---|---|---|---|
| Ex. 67 | | —O—CH(CH₂(OCH₂CH₂)ₙ—OCH₃)₂ <br> n = 7.2  Mn = 350 | 70% | Calculated C, 53,17; H, 8.79 <br> Found C, 53.20; H, 8.72 |
| Ex. 68 | | —OCH₂—CH((OCH₂CH₂)ₙ—OCH₃)₂ <br> n = 7.2  Mn = 350 | 66% | Calculated C, 53.10; H, 8.79 <br> Found C, 53.20; H, 8.72 |
| Ex. 69 | | —OCH₂— [dioxane ring with four (OCH₂CH₂)₃OCH₃ substituents] | 50% | Calculated C, 53.76; H, 8.93 <br> Found C, 53.83; H, 8.85 |
| Ex. 70 | aromatic ring with COCH₃, OCO—, OCO—R, OCO—R substituents | —O—(CH₂CH₂O)ₙ—CH₃ <br> n = 16.3  Mn = 750 | 80% | Calculated C, 53.74; H, 8.49 <br> Found C, 53.78; H, 8.45 |
| Ex. 71 | | —OCH₂—CH((OCH₂CH₂)ₙ—OCH₃)₂ <br> n = 7.2  Mn = 350 | 73% | Calculated C, 53.72; H, 8.48 <br> Found C, 53.78; H, 8.45 |
| Ex. 72 | | —O—CH(CH₂(OCH₂CH₂)ₙ—OCH₃)₂ <br> n = 7.2  Mn = 350 | 73% | Calculated C, 53.72; H, 8.46 <br> Found C, 53.78; H, 8.45 |
| Ex. 73 | | —OCH₂— [dioxane ring with four (OCH₂CH₂)₃OCH₃ substituents] | 60% | Calculated C, 54.30; H, 8.65 <br> Found C, 54.33; H, 8.61 |

EXAMPLE 74

Preparation of Porogen Having a Hydroxyl Group at the Terminal Portion

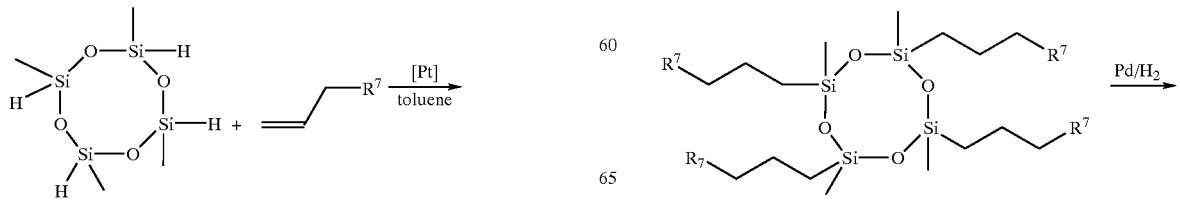

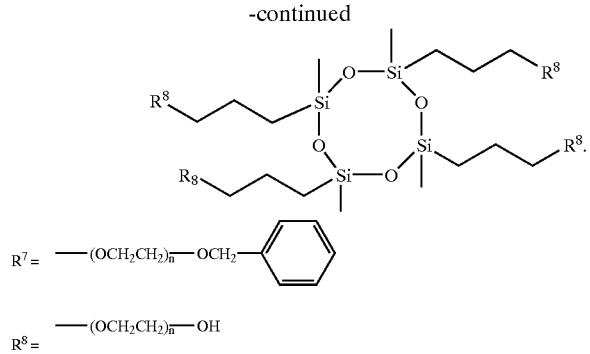

R⁷ = —(OCH₂CH₂)ₙ—OCH₂—⌬

R⁸ = —(OCH₂CH₂)ₙ—OH

Porogen having a benzyl group at the terminal portion was prepared by the hydrosilation of olefin having a benzyloxy group at the terminal portion and tetramethylcyclotetrasiloxane as in General Example 1.

¹H NMR(CDCl₃) δ(ppm) 0(s, 12H), 0.41(m, 8H), 1.54(m, 8H), 3.30(t, 8H), 3.4–3.9(m, 116H), 5.20(s, 8H), 7.0–7.5 (m, 20 H);

Elemental analysis: Found; C 58.34%, H 8.76% (Calculated; C 58.04%, H 8.59%)

The porogen having a benzyloxy group at the terminal portion and palladium-carbon were added into ethanol and reacted under N₂. The catalyst was filtered out and the filtrate was evaporated to obtain the porogen having a hydroxyl group at the terminal portion. When a molecular weight of the polyethylene glycol used in the reaction was 350, the yield was 87%. The porogen having a benzyl group may be used with a non-polar matrix, while the porogen having a hydroxyl group may be used with a polar matrix resin.

¹H NMR(CDCl₃) δ(ppm) 0(s, 12H), 0.41(m, 8H), 1.54(m, 8H), 2.80(br s, 4H), 3.30(t, 8H), 3.4–3.9(m, 116H); and Elemental analysis: Found; C 51.02%, H 8.64% (Calculated; C 50.78% H 8.98%).

EXAMPLE 75

Preparation of Porogen Having a Hydroxyl Group at the Terminal Portion

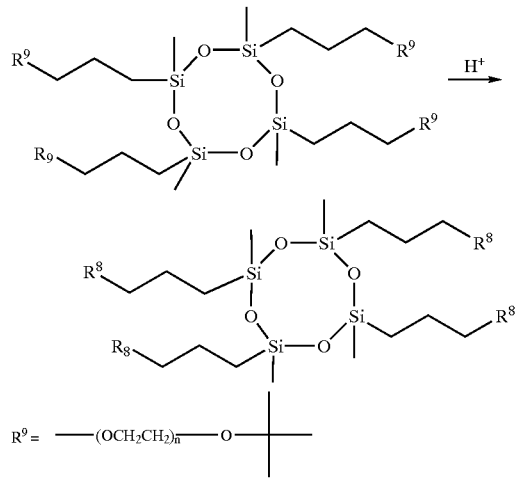

R⁹ = —(OCH₂CH₂)ₙ—O—⎛

R⁸ = —(OCH₂CH₂)ₙ—OH

Porogen having a tert-butyl group at the terminal portion was prepared by the hydrosilylation of olefin having a tert-butyl group at the terminal portion (n=7.2, $M_n$=350) with tetramethylcyciotetrasiloxane.

¹H NMR(CDCl₃) δ(ppm) 0(s, 12H) 0.41(m, 8H), 1.30(s, 16H), 1.54(m, 8H), 3.30(t, 8H), 3.4–3.9(m, 116H); and Elemental analysis: Found; C 54.51%, H 9.47% (Calculated; C 54.74% H 9.60%)

The porogen having a tert-butyl group at the terminal portion was dissolved in THF containing 10% (v/v) of 4N HCl aqueous solution and stirred at 60° C. for 5 hours. The reaction mixture was evaporated to dryness. The residue was dissolved into methylene chloride, washed with water and NaHCO₃ aqueous solution, dried over MgSO₄, evaporated to dryness. The residue was purified by column chromatography on silica gel to produce the porogen having a hydroxyl group (yield 68%).

GENERAL EXAMPLE 6

Preparation of Porogen Via Dehydrogenation

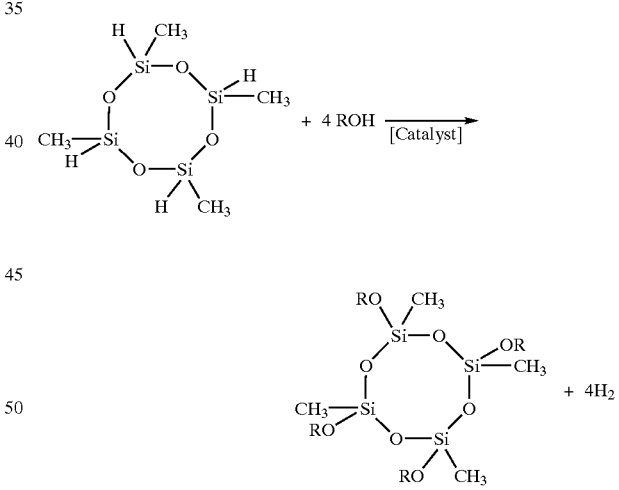

2,4,6,8-Tetramethylcyclotetrasiloxane (10 mmol) and alcohol (40 mmol) were dissolved in 50 mL of toluene. Platinum(0)-1,3-divinyl-1,1,3,3-tetramethyl disiloxane complex/xylene (3 mg) as a platinum catalyst was added at room temperature. When an exothermic reaction was over, the reaction was stirred at 100° C. for 3 hours. The reaction mixture was evaporated and purified by column chromatography on silica gel to produce the desired polyalkylene oxide porogen having hyper-branches.

EXAMPLES 76–80

Porogens in Table 8 were prepared by the same dehydrogenation procedure as in General Example 6.

TABLE 8

| Item | Porogen | OR | Yield | Elemental Analysis |
|---|---|---|---|---|
| Ex. 76 | cyclic tetrasiloxane with CH₃ and OR groups | —(OCH₂CH₂)ₙ—OMe<br>n = 16.3 Mn = 750 | 90% | Calculated C, 51.00; H, 9.14<br>Found C, 51.28; H, 9.11 |
| Ex. 77 | —O—CH(—(OCH₂CH₂)₃—OMe)(—(OCH₂CH₂)₃—OMe) | | 75% | Calculated C, 48.91; H, 8.93<br>Found C, 48.63; H, 9.07 |
| Ex. 78 | —OCH₂—CH(—(OCH₂CH₂)ₙ—OMe)(—(OCH₂CH₂)ₙ—OMe)<br>n = 7.2   Mn = 350 | | 86% | Calculated C, 53.30; H, 8.34<br>Found C, 51.33; H, 9.11 |
| Ex. 79 | POSS cage with M groups, M = —O—Si(—)(—)—OR | —(OCH₂CH₂)ₙ—OMe<br>Mn = 16.3 Mn = 750 | 81% | Calculated C, 45.19; H, 8.08<br>Found C, 44.93; H, 8.35 |
| Ex. 80 | —OCH₂—CH(—(OCH₂CH₂)ₙ—OMe)(—(OCH₂CH₂)ₙ—OMe)<br>n = 7.2   Mn = 350 | | 65% | Calculated C, 44.77; H, 8.70<br>Found C, 45.04; H, 8.35 |

EXAMPLE 81

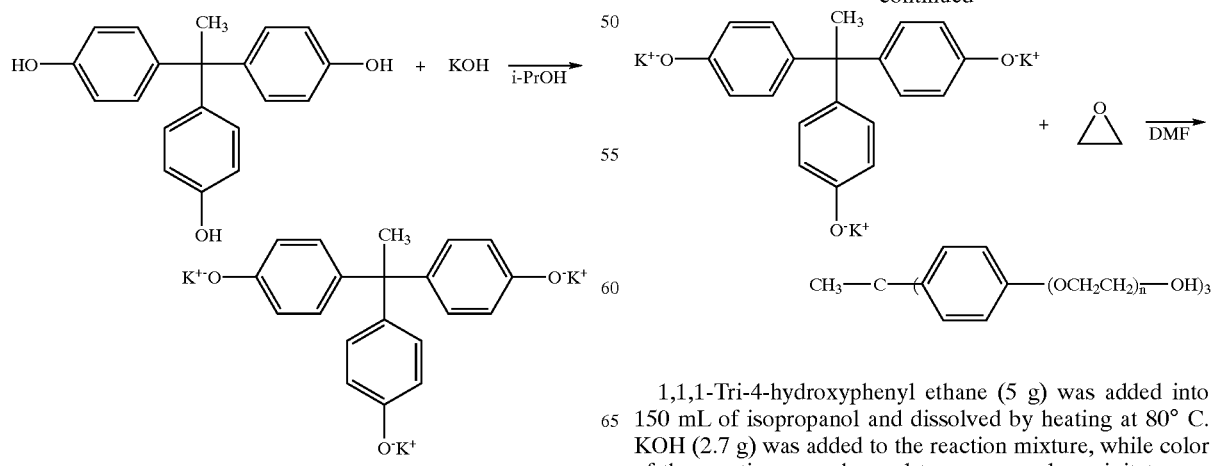

1,1,1-Tri-4-hydroxyphenyl ethane (5 g) was added into 150 mL of isopropanol and dissolved by heating at 80° C. KOH (2.7 g) was added to the reaction mixture, while color of the reaction was changed to orange and precipitate was produced. The reaction mixture was cooled to room temperature and the precipitate was collected by filtration, washed with heptane and dried. The dried potassium salt (1 g) was dissolved in 30 mL of dimethylformamide in a high pressure reactor. After adding ethylene oxide (4.7 g) was added, the reaction mixture was reacted at 80° C. for 3 hours. The reaction mixture was cooled to room temperature, neutralized with acetic acid, and filtered out the produced precipitate. The filtrate was evaporated to obtain while solid, followed by column chromatography on silica gel to produce the desired porogen (yield 78%).
Elemental analysis: Found; C 60.12% H 8.20% (Calculated: C 59.89% H 8.43%, n=8).

EXAMPLE 82

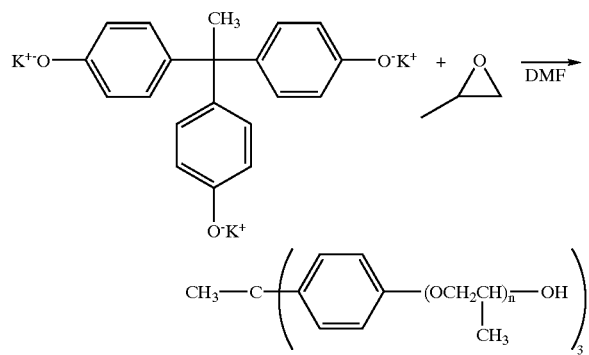

Polypropylene oxide porogen was prepared by the same procedure as in Example 81, except using propylene oxide (6.2 g) instead of ethylene oxide as while solid (yield 81%).
Elemental analysis: Found; C 65.25%. H 9.48% (Calculated: C 64.99%. H 9.60%., n=8).

EXAMPLE 83

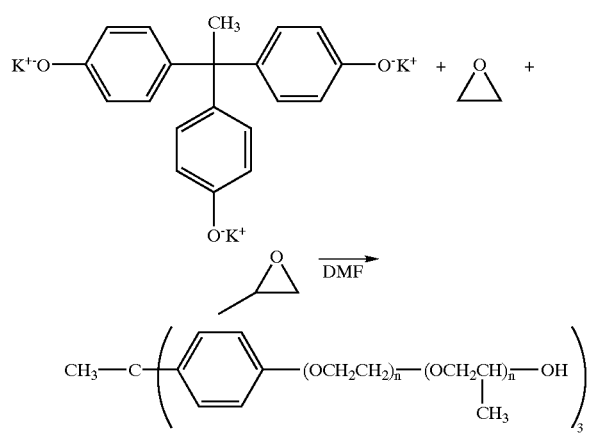

Porogen having ethylene oxide as well as polypropylene oxide branches was prepared by the same procedure as in Example 81, except employing ethylene oxide (2.4 g) first with stirring for 1 hour and then propylene oxide (3.1 g) as while solid (yield 60%).
Elemental analysis: Found; C 63.01% H 9.31% (Calculated: C 62.72% H 9.08%, n=4).

Experimental Example 1

Test for Thermal Decomposition

The polyalkylene oxide porogens prepared in Examples 3, 4, 18, and 27 were tested for thermal decomposition characteristics using TGA as shown in FIG. 1. According to FIG. 1, most of porogens were decomposed in ther temperature range of 200 and 450° C. Therefore, it was noted that the polyalkylene oxide porogens of the present invention were suitable in the formation of fine pores by using with resins having high heat resistance such as polymethylsilsesquioxane and polyimide used in the production of low dielectric constant insulator due to no decomposition at 450° C.

Experimental Example 2

Measurement of Refractive Index

Figure 2:
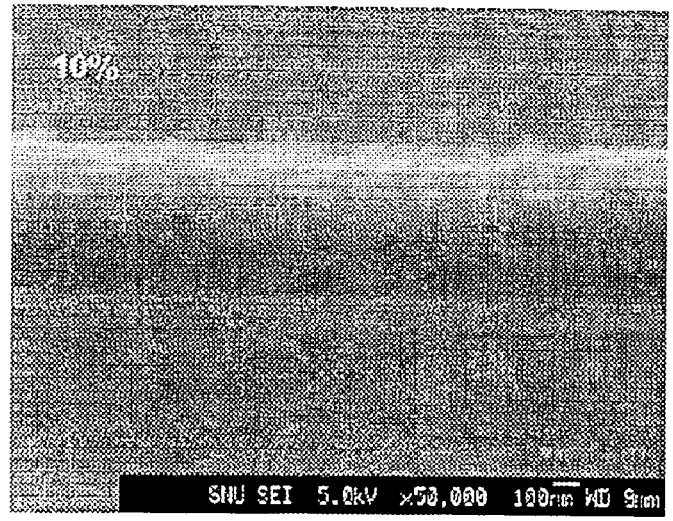
FIG. 2 represents a cross sectional SEM image of a polymethylsilesquioxane thin film containing 10 weight % of polyalkylene oxide porogen having hyper-branches after heat-treatment at 450° C. for 2 hours.
Figure 3:
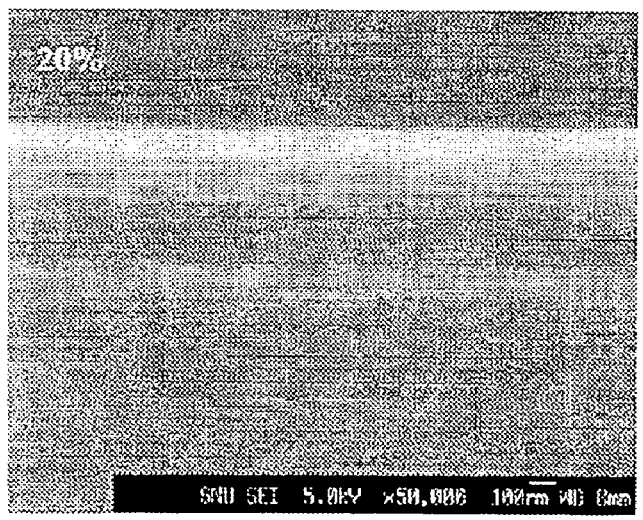
FIG. 3 represents a cross sectional SEM image of a polymethylsilesquioxane thin film containing 20 weight % of polyalkylene oxide porogen having hyper-branches after heat-treatment at 450° C. for 2 hours.

Organic methylsilsesquioxane of 15 weight % to methylisobutyl ketone was dissolved and each porogen 5, 10, 20, 30 weight % prepared in Example 4 was added therein. The mixture solution was spin coated on silicon wafer and cured at 200° C. A temperature of the mixture solution was increased at a rate of 10° C./min to reach 450° C. under $N_2$ atmosphere, where the porogen was completely decomposed, and then kept at the same temperature for 1 hour. A cross-section of the obtained thin film was measured with SEM to determine the formation of pores having nano size and the SEM photomicrographs were shown in FIG. 2 and FIG. 3. According to FIG. 2 and FIG. 3, the matrix resin and porogen were mixed homogeneously and a phase separation was estimated to be less than several tens of nm size, which meant that the pores have size was not higher than several tens of nm size.

A refractive index of the obtained thin film was determined by means of spectroscopic ellipsometry and it was noted that the refractive index was decreased with increase in a porogen content. Porosity was calculated by to employing Lorentz-Lorentz equation. The result was summarized in Table 9.

TABLE 9

| Content of porogen (wt. %) | 0 | 5 | 10 | 20 | 30 |
| --- | --- | --- | --- | --- | --- |
| Refractive index | 1.39 | 1.363 | 1.355 | 1.333 | 1.305 |
| Porosity | 0% | 6% | 8% | 13% | 18% |

The polyalkylene oxide porogens having hyper-branches of formula (1) of the present invention have thermal decomposition temperature of from 200 to 450° C., thus suitable for the formation of pores of nm size by using with a resin having high heat resistance which is used conventionally in the production of low dielectric constant insulator.

What is claimed is:
1. A polyalkylene oxide porogen of formula (1),

$$D\text{-}(Y\text{---}W)_l \quad (1)$$

wherein D is

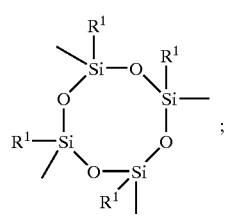

W is chosen from

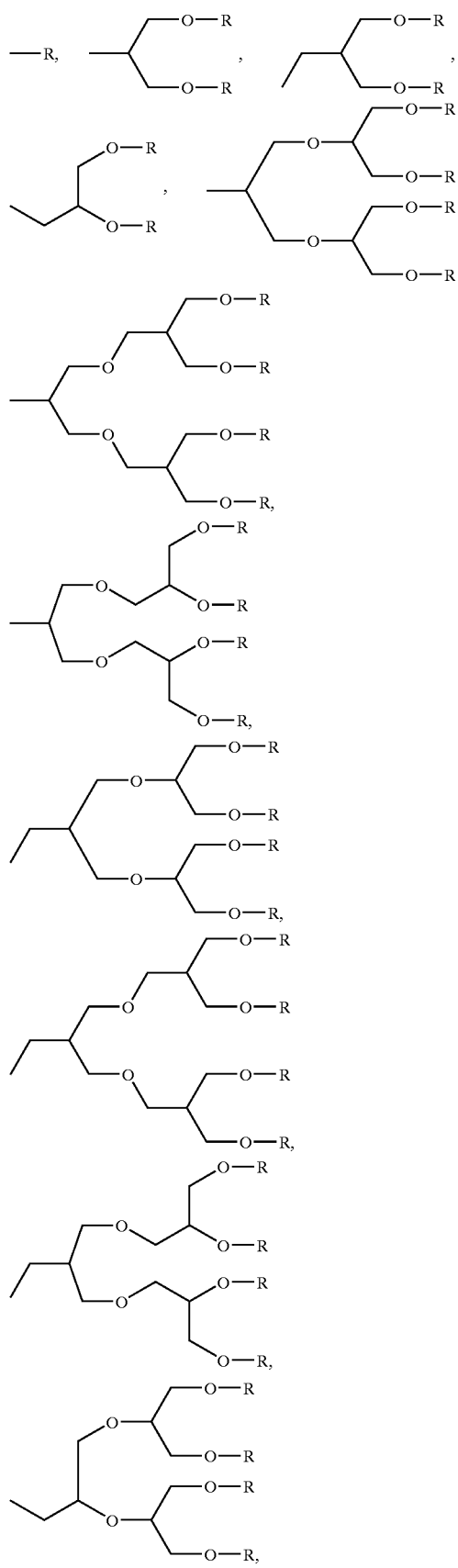

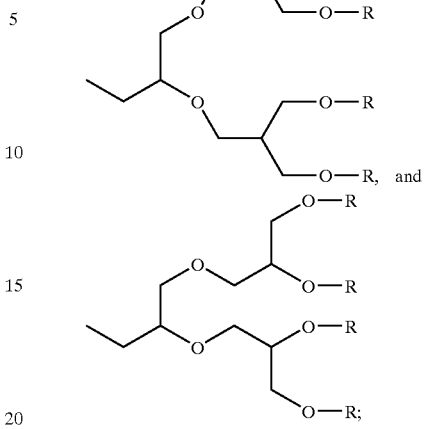

Y is

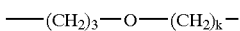

wherein k is an integer ranging from 0 to 4;
R is

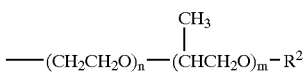

wherein each of n and m is independently an integer ranging from 0 to 30, but m and n are not zero at the same time;
R$^1$ is chosen from hydrogen, methyl, ethyl and phenyl;
R$^2$ is chosen from hydrogen, C$_1$–C$_5$ alkyl and benzyl; and
l is 4.

2. A method for preparing a polyalkylene oxide porogen by employing hydrosilylation according to the reaction below, Scheme 1

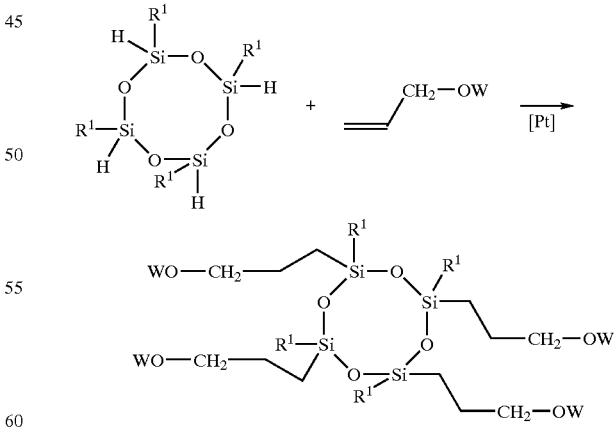

wherein W is defined as in claim 1.

3. A method for preparing a polyalkylene oxide porogen having a hydrogen at the terminal portion (R$^2$) by hydrogenolysis or photoreaction of a polyalkylene oxide porogen having a benzyl group at the terminal portion (R$^2$) according to the reaction below,

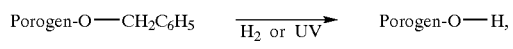

wherein the reactant, the product, or both are a polyalkylene oxide porogen according to formula (1) in claim 1.

4. A method for preparing a polyalkylene oxide porogen having a hydrogen at the terminal portion ($R^2$) by reacting a polyalkylene oxide porogen having a tert-butyl group at the terminal portion ($R^2$) with an acid catalyst according to the reaction below,

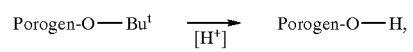

wherein the reactant, the product, or both are a polyalkylene oxide porogen according to formula (1) in claim 1.

* * * * *